United States Patent
Yang et al.

(10) Patent No.: US 8,933,816 B2
(45) Date of Patent: Jan. 13, 2015

(54) SYSTEMS AND METHODS FOR COMMUNICATION WITH A SMART POWER METER OVER OPTICAL FIBER

(75) Inventors: Wen Yang, Shanghai (CN); Daoman Xue, Shanghai (CN); Zhi Yong Pu, Shanghai (CN)

(73) Assignee: Atmel Corporation, San Jose, CA (US)

( * ) Notice: Subject to any disclaimer, the term of this patent is extended or adjusted under 35 U.S.C. 154(b) by 447 days.

(21) Appl. No.: 13/393,795

(22) PCT Filed: Feb. 7, 2012

(86) PCT No.: PCT/CN2012/070923
§ 371 (c)(1),
(2), (4) Date: Mar. 1, 2012

(87) PCT Pub. No.: WO2013/116985
PCT Pub. Date: Aug. 15, 2013

(65) Prior Publication Data
US 2013/0201031 A1    Aug. 8, 2013

(51) Int. Cl.
*G08B 23/00* (2006.01)

(52) U.S. Cl.
USPC .......... 340/870.02; 340/870.16; 398/140; 710/305

(58) Field of Classification Search
CPC ..... H04Q 9/00; H04Q 2209/60; G01D 4/004; Y02B 90/242; Y04S 20/322; G01F 15/063
USPC .......... 340/870.02, 870.16; 398/140; 710/305
See application file for complete search history.

(56) References Cited

U.S. PATENT DOCUMENTS

| 3,903,507 | A  | * | 9/1975 | Dillingham | .................. 370/360 |
| 5,802,307 | A  | * | 9/1998 | Melo | ............................. 709/232 |
| 6,172,615 | B1 | * | 1/2001 | Kogure | .................... 340/870.02 |
| 2008/0168302 | A1 | * | 7/2008 | Cagno et al. | ..................... 714/5 |
| 2011/0206381 | A1 | * | 8/2011 | Ji et al. | .......................... 398/140 |
| 2012/0066429 | A1 | * | 3/2012 | Daftardar | ..................... 710/314 |
| 2013/0031390 | A1 | * | 1/2013 | Smith et al. | .................. 713/320 |

FOREIGN PATENT DOCUMENTS

| CN | 1929689 A | 3/2007 |
| CN | 101141347 A | 3/2008 |

OTHER PUBLICATIONS

PCT International Search Report and Written Opinion mailed Nov. 22, 2012, in related International Application No. PCT/CN2012/070923.

* cited by examiner

*Primary Examiner* — Omer S Khan
(74) *Attorney, Agent, or Firm* — Fish & Richardson P.C.

(57) ABSTRACT

A system and method for facilitating smart power meter monitoring are provided. The system for facilitating smart power meter monitoring includes a standards-based frame detector, a CDR, at least one 8*b*/10 encoder/decoder and data links to receive input signals and transmit output signals. The system provides for the conversion of incoming SerDes signals, like those that may be transmitted from an optical module, into UART signals that can be communicated to the smart power meter directly through a UART port of the meter. The method includes receiving SerDes signals from an optical module and converting the signals to UART signals. The UART signals are converted to comply with industry standard protocols for communication with the smart power meter. The UART signals are then transmitted to the smart power meter through the meter's UART port.

15 Claims, 5 Drawing Sheets

SYSTEMS AND METHODS FOR COMMUNICATION WITH A SMART POWER METER OVER OPTICAL FIBER

RELATED APPLICATIONS

This Application relates, and claims priority to International Patent Application No. PCT/CN2012/070923 entitled "Systems and Methods for Communication with a Smart Power Meter over Optical Fiber", filed on Feb. 7, 2012, the disclosure of which is incorporated herein by reference in its entirety for all purposes.

BACKGROUND

1. Technical Field

The present disclosure relates to the field of smart power meter monitoring. More specifically, the present disclosure relates to systems and methods for communication between a smart power meter and data concentrators.

2. Discussion of Related Art

Current trends in the needs and methods of energy distribution have encouraged the use of so-called "smart meters", meters capable at least of being read remotely. Data can be collected from and sent to a smart meter remotely, i.e., without a human having to be present at the location of the meter. As energy prices increase, the number of users on the energy grid increase, and the sources of power feeding into the grid increase, the need for smart power metering has only become more pressing.

Currently, smart power meters have been proposed that may monitor electricity usage, cap maximum usage, turn power on or off at a given location, detect outages, and detect unauthorized use. Many current smart power meters utilize an embedded optical network unit (ONU) to interface between the data concentrator, a device receiving data from a large number of smart meters, via an Ethernet Passive Optical Network (EPON) and the smart power meters. The EPON ONU's have at least two drawbacks: they are relatively expensive and they consume significant amounts of power. This makes the deployment and use of smart power meters more expensive for consumers and utilities.

With large numbers of smart power meters needed to be installed to facilitate envisioned smart grid technologies, the use of smart power meters is expected to increase significantly in the coming years. What is needed is a smart power meter system with better ability to transmit data collected by smart meters to a data concentrator.

SUMMARY

Consistent with some embodiments of the invention, there is provided a method of communicating with a remote power meter. The method may comprise receiving optical signals from an optical line terminal at an optical module and converting the optical signals into serializer/deserializer (SerDes) signals using the optical module. The method may then call for detecting a power meter frame contained in the optical signals and converting that power meter frame to universal asynchronous receiver/transmitter (UART) signals using a UART/SerDes converter. The method may end by transmitting the UART signals to the remote power meter via a UART port associated with the meter.

According to some other embodiments of the invention, there is provided a system for converting SerDes signals to UART signals to facilitate smart power meter monitoring. The system may comprise a UART slave, a clock-and-data recovery module, a power meter frame detector, at least one 8b/10b encoder/decoder, a multiplexer for selecting between multiple signal sources, at least one data link to facilitate communication with a signal source and a signal destination and at least one buffer. Additional embodiments of the invention provide for a system for facilitating communication between an optical line terminal and a remote power meter. Such a system may comprise an optical module configured to receive optical signals from a data concentrator and to convert the optical signals to electrical signals, a microcontroller associated with a power meter configured to measure a set of characteristics regarding power usage at a defined location, and a UART/SerDes converter connected to the microcontroller by a UART port associated with the meter.

These and other embodiments will be described in further detail below with respect to the following figures.

Figure 1:
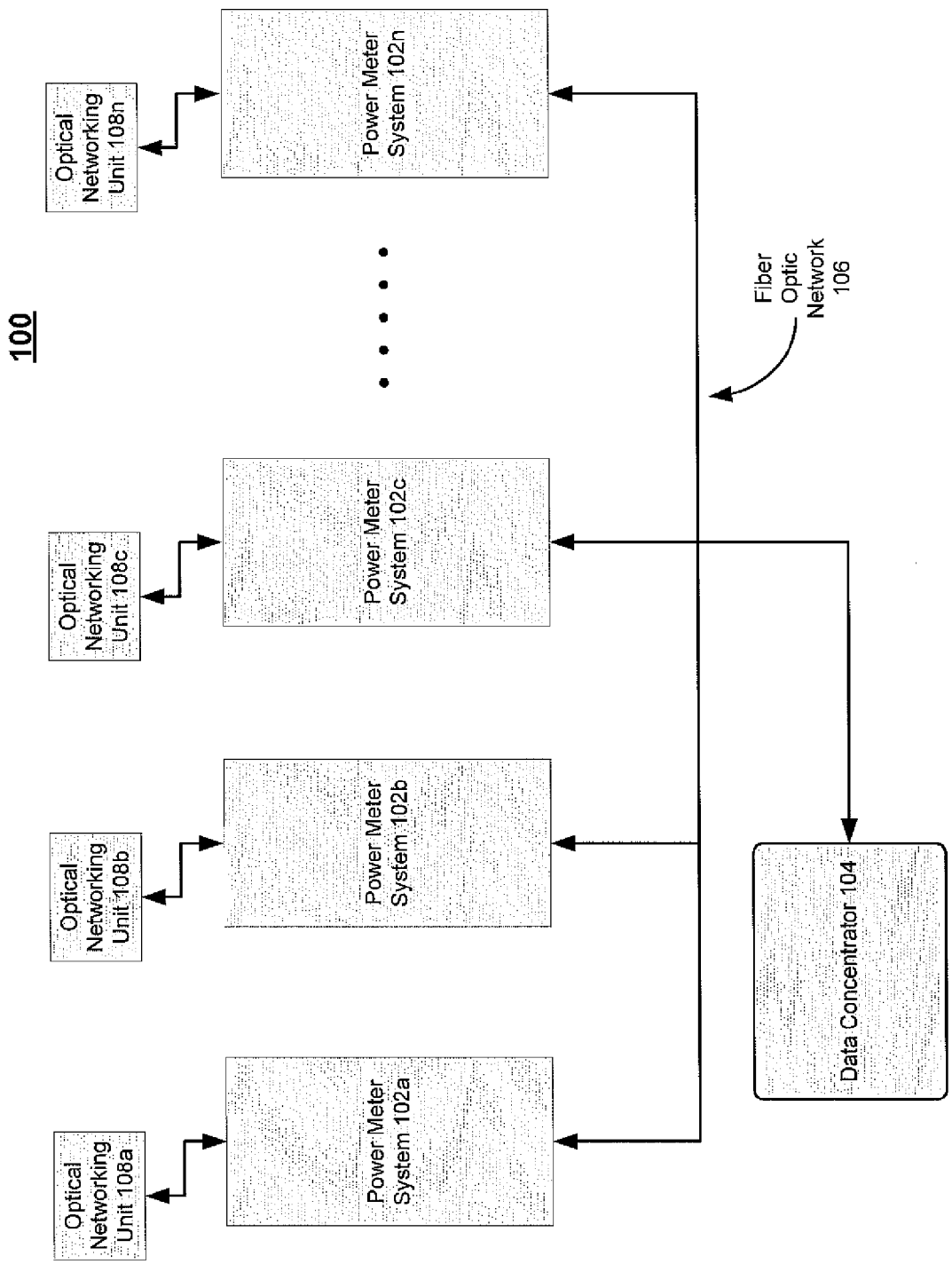
FIG. 1 is a diagram illustrating a system for remotely collecting power usage data from multiple smart power meters at multiple sites.

In the drawings, elements having the same designation have the same or similar functions. This is done to clarify and simply the presentation of various embodiments of the invention, and should not be construed to limit the scope of the invention.

The drawings may be better understood by reading the following detailed description.

DETAILED DESCRIPTION

FIG. 1 shows a diagram of a smart power metering network. The system includes a plurality of power meter systems 102a-n at locations where a utility customer will use power, such as houses, apartments, offices, etc. Power meter systems 102a-n may be capable of metering single-phase two-wire, single-phase three-wire, three-phase three-wire, three-phase four-wire systems, or other such systems as may be known in the art. Power meter systems 102a-n are coupled to data concentrator 104. Data concentrator 104 may be an optical line terminal or data collector and can be configured to be able to request and receive certain power-related data from the power meter systems 102a-n. When data concentrator 104 attempts to collect data from any of the power meter systems 102a-n, it sends optical signals through fiber optic line network 106. Fiber optic line network or optical fiber 106 communicatively couples power meter systems 102a-n to the data concentrator 104.

Power meter systems 102a-n contain functional blocks that allow for the conversion of optical signals to electrical signals, direct and convert signals as needed, and a power meter device for providing the smart meter data. Additionally, FIG. 1 shows optical network units 108a-n. Optical network units 108a-n may be used to provide telecommunication services to the location of the power meter systems 102a-n. As will be discussed in more detail below, one of optical network units 112*a-n* may be optionally coupled to each of power metering systems 102*a-n*.

Figure 2:
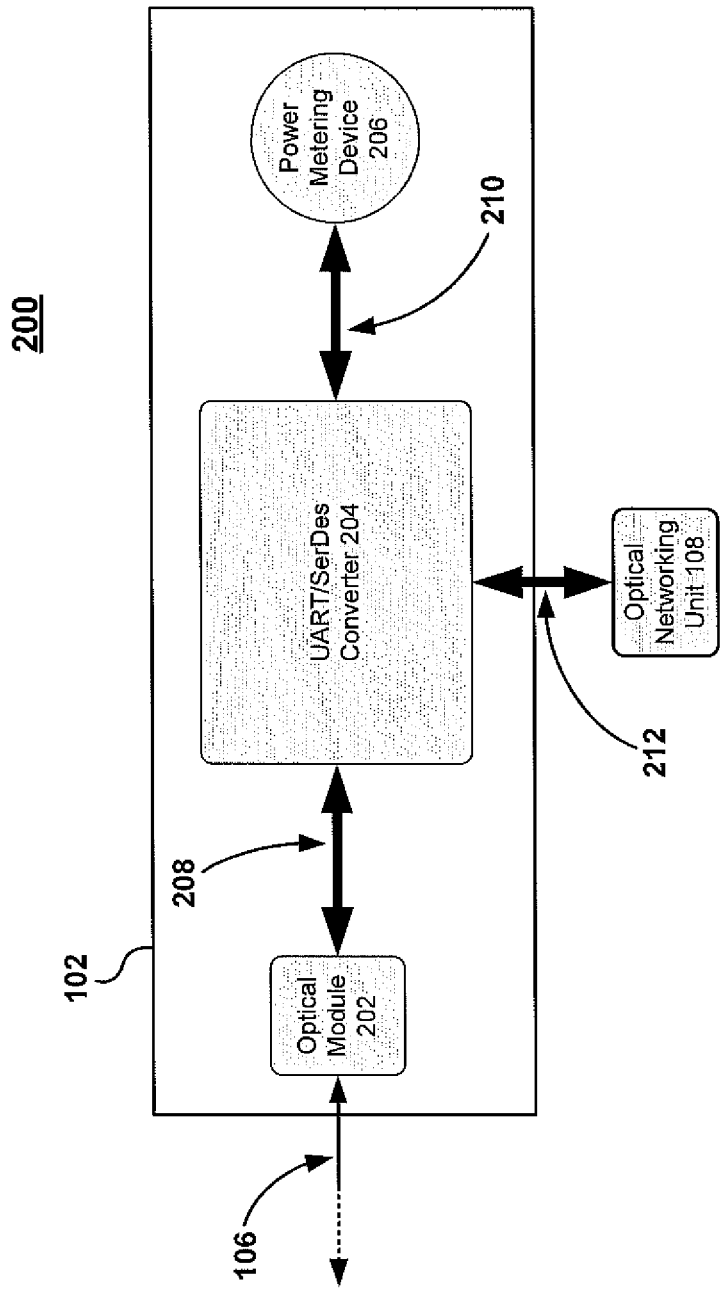
FIG. 2 is a diagram illustrating the use of a UART/SerDes controller in a smart power meter system.

FIG. 2 shows a system 200, an individual portion of system 100, the pathway between data concentrator 104 (not depicted) and various functional portions of a single power meter system 102. Thus, FIG. 2 illustrates a power meter system 102 including an optical module 202, a UART/SerDes converter 204, and a power metering device 206. Power metering device 206 comprises a microcontroller that may configure power metering device 206 to perform certain functions as may be disclosed. System 200 also includes an optical network unit 108. Optical network unit 108 is a device that implements a passive optical network protocol, such as the Ethernet Passive Optical Network (EPON) protocol, and provides telecommunications services to a location such as broadband Internet access, television, voice over IP (VoIP), or other communications media over fiber optic networks such as fiber optic network 106. An optical network unit 108 is absent in some embodiments of the invention. In many instances, an optical network unit may have a dedicated optical module. Embodiments of the invention disclosed here do not require optical network unit 108 to have a dedicated optical module.

Before optical signals sent by data concentrator 104 reach power metering device 206, they first encounter an optical module 202. Optical module 202 can be configured to convert the optical signals received from data concentrator 104 to signals that can be sent to power metering device 206. For example, the converted signals directed to the power metering device 206 may be electrical and sent over copper or other electrically conductive media. The signals may be converted to wireless signals or any other form suitable for transmission between optical module 202 and power metering device 206. After the optical signals have been converted by optical module 202 to signals for transmission to power metering device 206, the signals may encounter the UART/SerDes converter 204. "UART" as used herein refers to a universal asynchronous receiver/transmitter and/or signal related thereto; "SerDes" as used herein refers to a serializer/deserializer and/or signals related thereto. UART/SerDes converter 204 converts the SerDes signal output of optical module 202 into UART signals. The UART signals can then be transmitted directly to a UART port on the power metering device 206. The UART port of the power metering device 206 may be configured to allow communication via many different device communication protocols, such as Device Language Message Specification/Companion Specification for Energy Metering (DLSM/COSEM) and the DL/T 645 protocol standard. Such protocols may be designed to facilitate communication with remote power meters for smart metering applications. These and analogous standards are often applicable within a geographical or political entity such as a country or region, like China or Europe. The UART/SerDes converter 204 converts the SerDes signals to signals meeting the aforementioned standards so that the power metering device 206 may receive them communicably through a UART port.

As discussed above, optical module 202 transmits and receives serialized data to and from a data concentrator 104 through optical fiber network 106. Optical module 202 also transmits and receives serialized data to and from UART/SerDes converter 204. UART/SerDes converter 204 communicates with multiple devices. As shown in FIG. 2, UART/SerDes converter 204 is coupled to transmit and receive data with power metering device 206 and to communicate serialized data with optical module 202. Also, the UART/SerDes converter 204 may pass serialized data to and from the optional optical network unit 108 whenever it is present. System 200 also illustrates three data links that may allow UART/SerDes converter 204 to communicate with these multiple devices.

First, a SerDes data link 208 allows SerDes data to travel from the optical module 202 to the UART/SerDes converter 204 and back in the opposite direction. More detail regarding SerDes data link 208 will be given later.

Second, a UART data link 210 allows the transmission of serialized bits of properly formatted data to be sent from the UART/SerDes converter 204 to the power metering device 206 via a UART port on power metering device 206. UART data link 210 also allows transmission from the UART/SerDes converter 204 to the power metering device 206.

Third, system 200 shows an optional SerDes data link 212. Optional SerDes data link 212 allows communication of properly assembled Ethernet frames {e.g. 802.3 frames} to be transmitted through the UART/SerDes converter 204 to an EPON optical network unit 108. The optical network unit 108 may be located externally relative to the optical module 202 and UART/SerDes converter 204. In some embodiments of the invention, no optical network unit 108 is present. In this sense the optical network unit 108 is optional. It is also in this sense that the optional SerDes data link 212 is optional. The hardware required to support data link 212 may be present in some embodiments of the invention and not in others, and the optical network unit 108 with which it connects may be present in some embodiments while not present in others. However, the presence of optical network unit 108 in a given embodiment may require the presence of data link 212.

Figure 3:
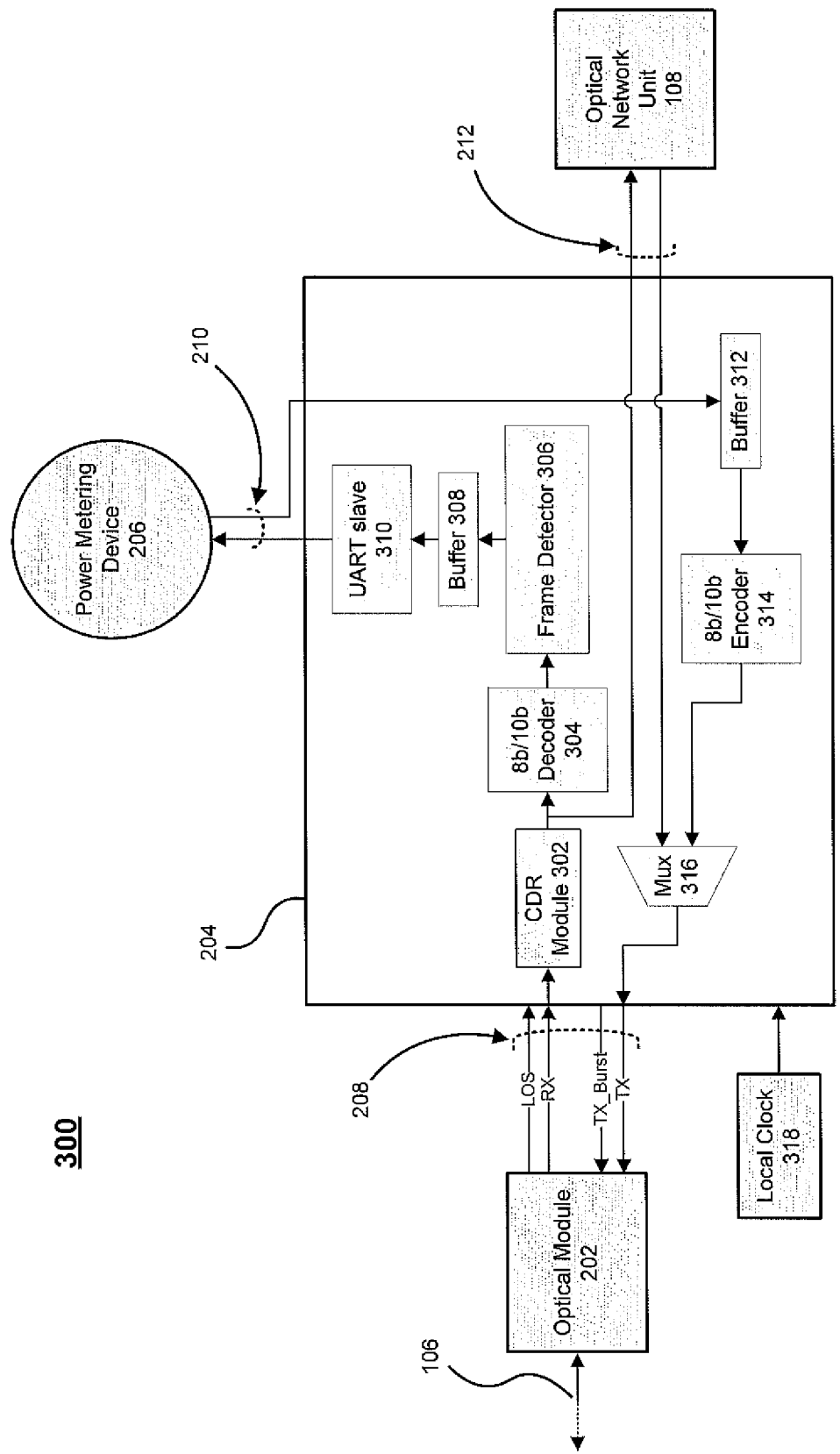
FIG. 3 is a diagram illustrating the device architecture of a UART/SerDes converter as used in a smart power meter.

FIG. 3 presents a detailed view of circuit or system 300, including an embodiment of the UART/SerDes converter 204 portion of the embodiment of the invention as seen in FIG. 2. SerDes data link 208 is depicted as comprising multiple data lines. The multiple data lines of SerDes data link 208 may include a TX line, an RX line, a loss-of-signal indicator line, and a TX Burst line. The UART/SerDes converter 204 can be configured to accept these lines as inputs and outputs. UART/SerDes converter 204 also may include a clock-and-data recovery (CDR) module 302. CDR module 302 may be used to allow a clock to be recovered for the optical signals which may be sent without accompanying clock signals. Recovering the clock for the incoming signals may ensure proper transmission of the signal further down the signal chain. From the CDR module 302, signals from the data concentrator 104 may be routed to an 8*b*/10*b* decoder 304, or other suitable type of signal decoder, and, whenever the optical network unit 108 is present, to the ONU 108 through optional SerDes data link 212.

After the incoming signal is decoded by the 8*b*/10*b* decoder 304 it may be transmitted to the frame detector 306 in parallel form. Frame detector 306 may be configured to detect whether the signals from the data concentrator 104 comprise instructions or requests for the power metering device 206. Frame detector 306 may determine whether the signals conform to an applicable standard, such as the DLMS/COSEM and DL/T 645 protocols, and may condition the signals for transmission to the power metering device 206. The properly assembled, standard-conforming frames detected and/or formed from the incoming signals by frame detector 306 may then be sent through buffer 308 to a UART slave 310. UART slave 310 may be configured to accept parallel data from the buffer 308 and convert it to serialized bits. The serialized bits may be transmitted to a UART port of power metering device 206 through UART data link 210.

The serialized data sent by the UART slave 310 may be reassembled into parallel form by the power metering device 206 to determine what actions the request from the data concentrator 104 is instructing. The signals sent to the power metering device 206 from data concentrator 104 (and converted by the UART/SerDes converter 204) may direct power metering device 206 to gather certain data regarding power usage at the site of the meter. The power metering device 206 may then send responsive data back to the UART/SerDes converter 204 through UART data link 210. The responsive data may be received by UART/SerDes converter 204 in a parallel form, and may be directed to a buffer 312 before it goes to an 8b/10b encoder 314, or other suitable type of signal encoder. In some embodiments, the responsive data received by the UART/SerDes converter 204 may be received in serialized form. After being serialized by the 8b/10b encoder 314, the encoded, responsive data then goes to a multiplexer 316 (or mux 316).

In the UART/SerDes converter 204, mux 316 may be used to select between the outputs of the power metering device 206 and the optical network unit 108. The use of mux 316 configures the UART/SerDes converter 204 to be able to functionally incorporate the optical network unit 108 whenever the optical network unit 108 is present in an embodiment of the invention. Control of mux 316 may be maintained and exercised in several ways.

In some embodiments of the invention there is tight control exerted by data controller 104. Data concentrator 104 may reserve time slots for different types of data. Thus, responsive data from power metering device 206 may be selected by arriving at mux 316 at a predetermined time slot during which the data link from the power metering device is selected. The responsive data will then be passed by mux 316 during its time slot. The responsive data may be sent over the TX line of SerDes data link 208 to reach optical module 202. Optical module 202 may then convert the electrical signals sent from the UART/SerDes converter 204 into optical signals suitable for transmission over optical fiber network 106 to data concentrator 104.

In some embodiments, mux 316 may operate as a signal summing device. In such embodiments, data concentrator 104 may effectively control the selection of signals passed by mux 316 by controlling the timing of optical signals sent containing power meter frames and optical signals sent not containing power meter frames. By correct anticipation of the response times, the data concentrator 104 may cause a summing device to behave effectively as a multiplexer.

In embodiments where optical networking unit 108 is present, the data concentrator may send optical signals over fiber optic network 106 intended for optical network unit 108. Such signals may include those associated with Internet, VoIP, or television signals. For example, optical signals comprising a packet of VoIP communication data may be received by optical module 202. Optical module 202 may then convert the optical signals into electrical signals which will be passed to the UART/SerDes converter 204, arriving first at CDR module 302. CDR module 302 may recover the clock and better condition the signals, which will be transmitted further down the signal chain. The signals may be sent to frame detector 306. Since the signals do not comprise frames suitable for the power metering device, frame detector 306 may not attempt to transmit the signals further. The signals may also travel to optical network unit 108, which may be configured to recognize and process the packet as a VoIP communication packet.

Optical networking unit may transmit a VoIP packet originating at the site of power metering system 102 to data concentrator 104. The site-based VoIP packet may be transmitted to UART/SerDes converter device over optional SerDes data link 212. Since the packet may comprise serialized data as transmitted, the packet may first encounter mux 316. Through control by data concentrator 104, a time slot may be provided such that the site-based VoIP packet may be selected by mux 316 and sent over the TX line of SerDes data link 208 to optical module 202. Optical module 202 may then convert the packet to optical signals which may then be sent over optical fiber network 106 to data concentrator 104.

FIG. 3 also depicts a local clock 318. Local clock 318 may be used to facilitate the proper functioning of the UART/SerDes converter 204 as it performs the activities disclosed above, such as converting, encoding, decoding, transmitting, and receiving. Local clock 318 may further ensure that the time slots used to control mux 316 are properly allocated.

Figure 4:
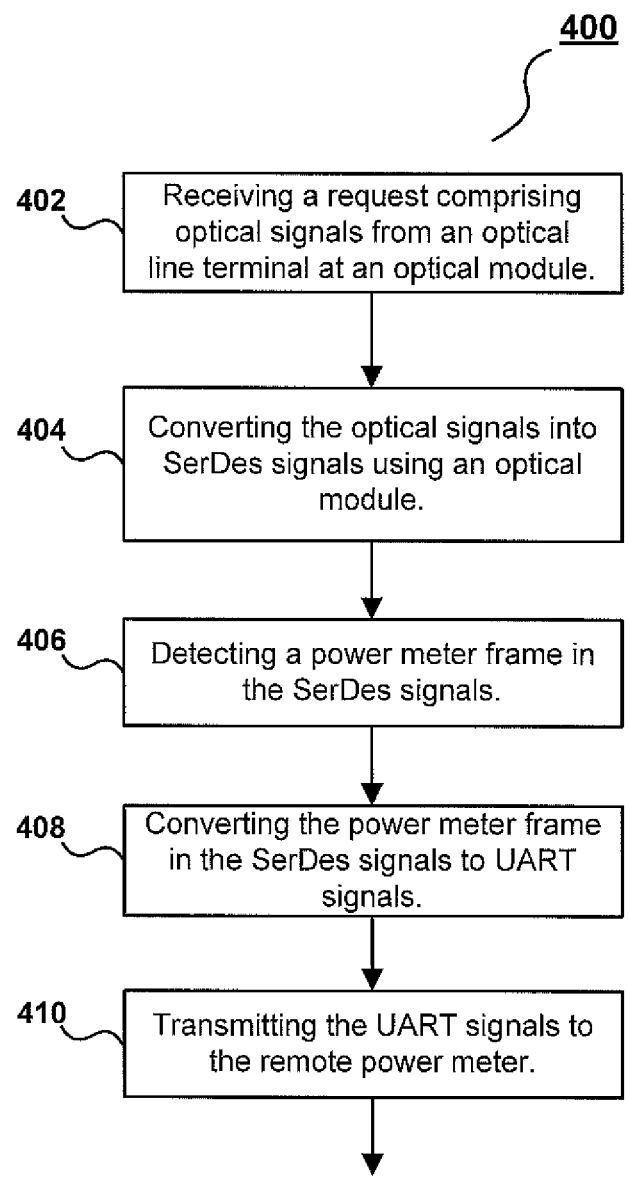
FIG. 4 is a flowchart illustrating a method for remotely monitoring power usage data with a smart power meter.

FIG. 4 shows a flowchart for a method 400 for communicating with a remote power meter. This method and others disclosed herein can be performed using embodiments of the invention such as represented by systems 100, 200, and 300. Features of those systems may be used to more clearly describe method 400, but should not be construed as limiting the methods. Method 400 begins at step 402 by receiving a request from an optical line terminal, such as data concentrator 104, through a fiber optic network line 106 at optical module 202. The request may comprise a request to the power metering device 206 to read the meter, to stop or start power at the location of power metering device 206, to provide the status of electrical service at the location, or other such request. The request can then be converted from an optical form to electrical, SerDes form by the optical module 202, in step 404.

After the request has been converted to electrical form, frame detector 306 may detect a power meter frame in the SerDes signals, in step 406. The SerDes signals may be converted by UART/SerDes converter 204 to UART signals before they can be transmitted to the remote power meter. This may be done in step 408. The conversion of the SerDes signals to UART signals can be performed so that the UART signals will conform to industry standard protocols as mentioned earlier for communication with smart power meters. Then, in step 410, the UART/SerDes converter 204 may transmit the UART signals to the power metering device 206. The transmission reaches the power metering device 206 through the device's UART port, where a microcontroller of power metering device 206 may process and respond to data concentrator 104's request.

Figure 5:
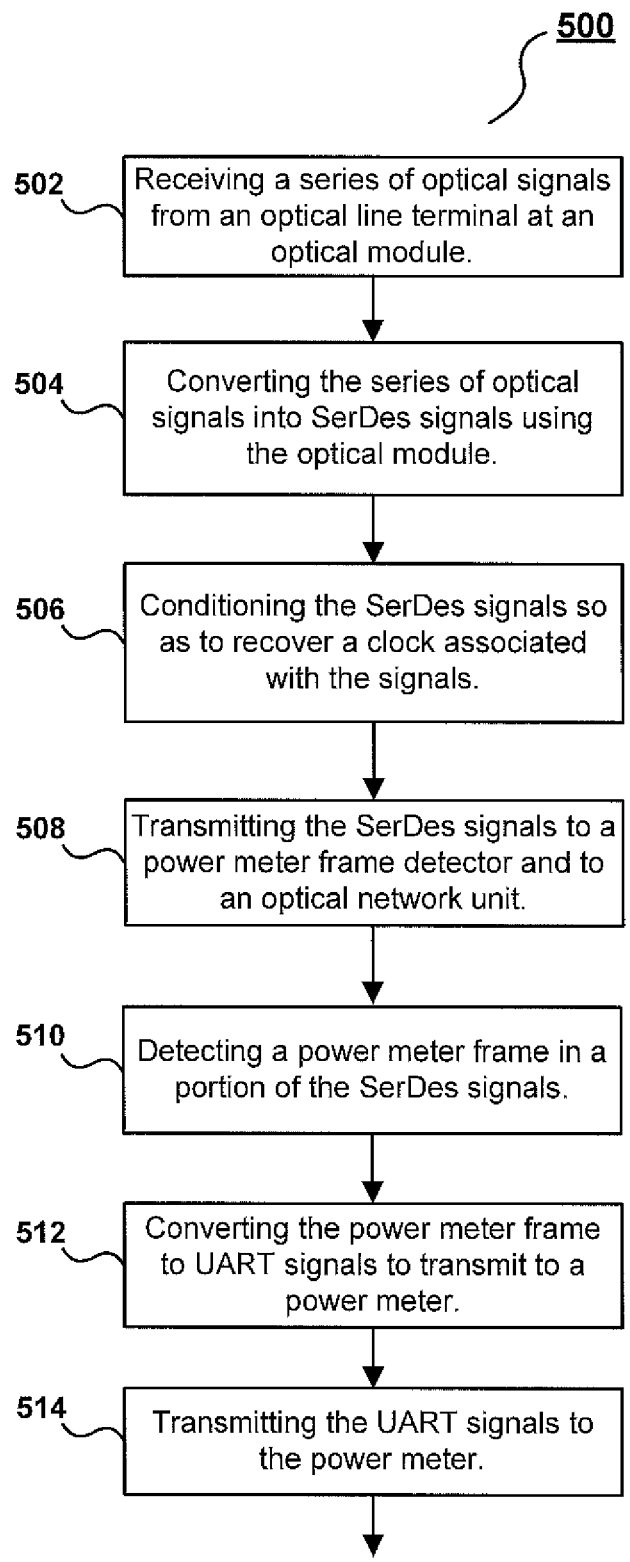
FIG. 5 is a flowchart illustrating another method for remotely monitoring power usage data with a smart power meter, which includes steps for communicating with an optional EPON optical network unit.

FIG. 5 shows a flowchart depicting another embodiment of a method to facilitate communication between a data concentrator 104 and a power metering device 206. Method 500 begins in step 502 when an optical module 202 receives a series of signals from data concentrator 104 over optical fiber network 106. The optical module 202 may convert the series of optical signals into a series of electrical, SerDes signals in step 504. The optical module 202 transmits the series of SerDes signals to the UART/SerDes converter 204. In step 506, the SerDes signals may be conditioned by the clock-and-data recovery module 302 so as to recover a clock signal associated with the SerDes signals. The series of SerDes signals may be sent to frame detector 306 within the UART/SerDes converter 204 in step 508. The series of SerDes signals may also be sent to optical network unit 108 through optional SerDes data link 212 in step 508. The series of SerDes signals may include some data frames comprising a request that power metering device report current usage and some data frame comprising Internet communications.

In step 510, frame detector 306 may detect power frames in the signal series. Frame detector 306 will not recognize the Internet communication frames in the series and consequently may decline to transmit them to UART slave 310 to power metering device 206. However, frame detector 306 will recognize the DL/T frames in the series of SerDes signals and send those DL/T frames to UART slave 310 for conversion to UART signals to be sent to power metering device 206 over UART data link 210. Meanwhile, optical networking unit 108 will not recognize the DL/T frames in the series and consequently may not act responsively to those frames. However, optical networking unit 108 will recognize the Internet communication frames in the series of SerDes signals and continue processing those Internet communication frames. In this manner, the UART/SerDes converter 204 may receive signals intended for the power metering device 206 and optical network unit 108 over fiber optic network 106 from data concentrator 104.

In step 512, the UART/SerDes converter 204 converts the SerDes signals into appropriately framed UART signals, which are transmitted to the remote power metering device 206 through its UART port in step 514. FIG. 5 may be understood as depicting certain embodiments of the invention that incorporate the use of an external EPON ONU. However, method 500 may be performed substantially as described even when no external EPON ONU is actually present and in communication with the UART/SerDes converter 204.

In the detailed description above specific details have been set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is still within the scope and spirit of this disclosure.

What is claimed is:

1. A system for converting SerDes signals to UART signals to facilitate smart power meter monitoring, the system comprising:
    a UART slave;
    a clock-and-data recovery module;
    a power meter frame detector;
    at least one signal encoder/decoder;
    a multiplexer for selecting between multiple signal sources; at least one data link to facilitate communication with a signal source and a signal destination;
    at least one buffer;
    a communication link configured for transmission and receipt of data from an optional optical network unit device; and
    an optical module configured to receive and convert optical signals.

2. The system of claim 1, wherein the power meter frame detector is configured to comply with the at least one of the Device Language Message Specification, the Companion Specification for Energy Metering, the DL/T 645 standard, or other standard power meter communication protocol.

3. A system for facilitating communication between an optical line terminal and a remote power meter, the system comprising:
    an optical module configured to receive optical signals from a data concentrator and to convert the optical signals to electrical signals;
    a microcontroller associated with a power meter configured to measure a set of characteristics regarding power usage at a defined location; and
    a UART/SerDes converter connected to the microcontroller via a UART port associated with the meter;
    wherein the UART/SerDes converter comprises:
        a clock and data recovery module;
        a power meter frame detector;
        a UART slave;
        at least one signal encoder/decoder;
        a local clock; and
        at least one buffer.

4. The system of claim 3, wherein the power meter frame detector is configured to detect signals that comply with at least one of the Device Language Message Specification, the Companion Specification for Energy Metering, and DL/T 645 or other standard power meter protocol.

5. The system of claim 3, wherein the UART/SerDes converter further comprises a communication link configured to allow communication with an optical network unit device, the optical network unit not comprising an optical module.

6. The system of claim 5, further comprising an optical network unit device, the optical network unit device configured externally in relation to the UART/SerDes converter and in communication with the UART/SerDes converter via the communication link.

7. The system of claim 6, further comprising a multiplexer configured to select for transmission to an optical line terminal one of:
    a first data stream, the first data stream being transmitted by the microcontroller; and
    a second data stream, the second data stream being transmitted by the optical network unit device.

8. The system of claim 7, wherein the multiplexer selects one of the first and second data stream for transmission to an optical line terminal by switching at predetermined time intervals between the first and second data stream.

9. The system of claim 6, wherein:
    the UART/SerDes converter is configured in a first housing; and
    the optical network unit device is configured in a second housing.

10. A method of communicating with a remote power meter, the method comprising:
    receiving optical signals from an optical line terminal at an optical module;
    converting the optical signals into SerDes signals using the optical module;
    detecting a power meter frame contained in the optical signals, wherein the power meter frame conforms to an industry standard power meter communication protocol;
    converting the power meter frame to UART signals using a UART/SerDes converter, wherein detecting and converting the power meter frame to UART signals is performed by using a UART/SerDes converter;
    transmitting the UART signals to the remote power meter via a UART port;
    receiving responsive UART signals from the remote power meter at the UART/SerDes converter;
    converting the responsive UART signal into responsive SerDes signals;
    converting the responsive SerDes signals into responsive optical signals using an optical module; and
    sending the responsive optical signals to the optical line terminal through optical fiber.

11. The method of claim 10, wherein the responsive UART signals comprise a response to at least one of a meter reading command and a status indication command.

12. The method of claim 10, further comprising: conditioning the SerDes signals so as to at least recover a clock associated with the SerDes signals; and transmitting the optical signals to an optical network unit device, the optical signals containing a first Ethernet frame in addition to the power meter frame.

13. The method of claim 10, further comprising: receiving, by the UART/SerDes converter, a second Ethernet frame from the optical network unit device; and selectively transmitting the second Ethernet frame to the optical module.

14. The method of claim 13, wherein selectively transmitting the second Ethernet frame comprises using a multiplexer to select between the responsive UART signals and the second Ethernet frame for transmission to the optical module.

15. The method of claim 14, wherein using a multiplexer comprises switching between a state transmitting signals from the remote power meter and a state transmitting signals from the optical networking unit at predetermined time intervals.

* * * * *

UNITED STATES PATENT AND TRADEMARK OFFICE
CERTIFICATE OF CORRECTION

PATENT NO. : 8,933,816 B2  
APPLICATION NO. : 13/393795  
DATED : January 13, 2015  
INVENTOR(S) : Wen Yang et al.

Page 1 of 1

It is certified that error appears in the above-identified patent and that said Letters Patent is hereby corrected as shown below:

Title Page, item 57

Column 2 (Abstract), Line 4 Delete "8b/10" and insert --8b/10b--, therefor.

In the Specification

Column 3, Line 48-49 Delete "(DLSM/COSEM)" and insert --(DLMS/COSEM)--, therefor.

Column 4, Line 17 Delete "{e.g." and insert --(e.g.--, therefor.

Column 4, Line 17 Delete "frames}" and insert --frames)--, therefor.

Signed and Sealed this
Second Day of June, 2015

Michelle K. Lee
*Director of the United States Patent and Trademark Office*